United States Patent [19]

Worzek

[11] Patent Number: 4,648,203
[45] Date of Patent: Mar. 10, 1987

[54] TREE PROTECTOR

[75] Inventor: Michael Worzek, McMinnville, Tenn.

[73] Assignee: Feldkircher Wire Fabricating Co., Inc., Nashville, Tenn.

[21] Appl. No.: 758,037

[22] Filed: Jul. 23, 1985

[51] Int. Cl.$^4$ ............................................. A01G 13/02
[52] U.S. Cl. ........................................................ 47/32
[58] Field of Search .................. 47/23, 25, 32, 33, 73, 47/87

[56] References Cited

U.S. PATENT DOCUMENTS

| | | | |
|---|---|---|---|
| 313,424 | 3/1885 | Hughes | 47/25 |
| 1,110,377 | 9/1914 | Cowles | 47/32 |
| 1,130,545 | 3/1915 | Scott | 47/58 |
| 1,130,546 | 3/1915 | Scott | 47/25 |
| 1,931,602 | 10/1933 | Colman | 47/25 |
| 2,978,837 | 4/1961 | Daniels | 47/25 |
| 3,005,287 | 10/1961 | Dudley | 47/25 |
| 3,287,851 | 11/1966 | Cramer | 47/25 |
| 3,305,969 | 2/1967 | Mattson | 47/25 |
| 3,571,972 | 3/1971 | Carter, Jr. | 47/25 |
| 3,704,004 | 11/1972 | Carter, Jr. | 256/1 |
| 3,755,965 | 9/1973 | Emery | 47/27 |
| 3,857,195 | 12/1974 | Johnson | 47/32 |
| 3,896,586 | 7/1975 | Caldwell | 47/28 |
| 3,940,884 | 3/1976 | Mason | 47/32 |
| 4,268,992 | 5/1981 | Scharf, Sr. | 47/23 |
| 4,308,688 | 1/1982 | Revane | 47/25 |
| 4,381,622 | 5/1983 | Spidell | 47/33 |

FOREIGN PATENT DOCUMENTS

| | | | |
|---|---|---|---|
| 2518441 | 11/1976 | Fed. Rep. of Germany | 47/32 |
| 2729454 | 1/1978 | Fed. Rep. of Germany | 47/73 |
| 1284768 | 8/1972 | United Kingdom | 47/32 |
| 2053640 | 2/1981 | United Kingdom | 47/25 |
| 2078479 | 1/1982 | United Kingdom | 47/32 |

Primary Examiner—James R. Feyrer
Attorney, Agent, or Firm—William D. Stokes

[57] ABSTRACT

A protector for surrounding the base of a trunk of a tree (18) includes a base (2), a barrier wall (4) and, a slit (10) which extends, on a centerline, through the major portion of base (2). The central portion of base (2) is defined by a plurality of cresent shaped flaps (2), each attached to the next by a hinge (14), on each side of the centerline (10). The central base structure allows for case of installation and provides for tree growth while allowing capture and permeation of liquids held in the reservoir defined by the barrier wall (4) to the root zone. An outwardly directed flange (6) on base (2) serves as a mower track which can be anchored by pins (20) through punch out holes (24) defined on flange (6).

5 Claims, 6 Drawing Figures

CROSS SECTION A—A

TREE PROTECTOR

FIELD OF THE INVENTION

The present invention relates to a permanently installed plant and tree protector device providing means for promoting growth of the plant or tree and capable of self adjustment or being manually adjustable to the enlarging diameter of the trunk of a plant or tree without removal of the protector.

PRIOR ART

It is well known in the art that two of the major causes of tree damage are lawn mower nicks and string trimmer burns. Irreparable tree damage can occur at any time during the life of a tree or a plant from lawn mower and edging damage. Accordingly, numerous devices have been proposed to protect trees from such damage. The most notable devices proposed have been of the type for closely mounting around the base of a plant or tree preventing close encroachment to the trunk by damaging machines. In general, the previously known devices, trunk base hugging devices comprise a substantially flat base member having a centrally located circular opening through which the trunk or stalk is passed. Many of the known type of protectors have a slit extending from the circular opening to the outer edge of the base member in order to facilitate the envelopement of the trunk or stalk. Others of these known type protectors are simply separable in two or more parts, the central opening for the trunk in each part being less than a circle depending upon the number of parts. The known devices also have incorporated various structural modifications for strength and other purposes, for example, wall and container devices constructed perpendicular to the base enclosing spaces in which various substances may be held in close proximity to the root system, for example, stones, mulch and fertilizer. The bases of such devices often have holes or tubular elements extending into the ground therefrom through which water or fertilizer trickles into the soil beneath. All of the known devices have contributed to the progress of the art in providing particular means of protection to the base of the tree. Another of the known type devices provides a construction which may be permanently installed around the base of the tree and comprises means whereby the growth of the trunk in diameter may be accommodated, without replacement of the device or being constructed in two parts. Such devices usually comprise fingers which extend up the tree or stalk from the periphery of the central opening and hug the tree, gradually splitting the base laterally outwardly as the tree diameter becomes larger. Such fingers themselves often become imbedded in the delicate bark of the tree causing considerable damage to the tree. Other devices allow for sections of the base to be cut out and removed as the diameter of the tree enlarges.

Examples of the devices known in the art and discussed hereinabove are disclosed in, for example, in U.S. Pat. Nos. 1,110,377; 1,130,545; 1,931,602; 2,978,837; 3,005,287; 3,287,851; 3,305,969; 3,571,972; 3,704,004; 3,775,965; 3,896,586; 4,268,992; and 4,308,688.

SUMMARY OF THE INVENTION

In accordance with the invention, there is provided a tree or plant trunk and root protection device comprising a generally, flat ground engaging, base member having a centrally located opening for the tree or plant stalk, a barrier wall perpendicularly mounted on the base member away from its peripheral edge and away from the central opening, the area of the base member within the barrier wall forming a walled, tray-like area and the portion of the base member external to the wall forming a flange or apron extending beyond and surrounding the barrier wall. A median slit extends from one edge of the base through the wall and the tray to the centrally located opening in the base and for a distance beyond the central opening but not to the opposite barrier wall. Surrounding the central opening and within the tray area are a plurality of slits concentrically arranged with respect to the central opening forming a plurality of semi-circular, concentrically arranged flaps. Each flap is hinged to the adjacent flap. The plane of the flap hinges lies generally at a right angle to the median slit of the device. As the tree trunk or plant stalk enlarges in diameter, a hinge will allow the flap adjacent the tree trunk to open upwardly allowing the central opening to become larger to conform to the enlarged-trunk. One of the major advantages of the present invention is the provision of a permanent type protection device which fits closely to the trunk of the tree and is not affected by the climatic elements and soil conditions while not having to be replaced as the tree trunk grows enlarging in diameter.

Another important advantage of the device of this invention is that any fertilizer or water fed to the tree installation of the device is evenly distributed and directly to the root system.

It is an important advantage of the invention to provide a barrier to damage of tree trunks or plant stems from lawn mowers and string trimmers.

Still another advantage of the invention is a device that provides a barrier to the evaporation of moisture from around the base of the tree or plant.

A principal advantage of the device is the provision of a simple, practical and relatively inexpensive tree or plant protector that is readily adaptable to being produced by a vacuum forming and clicker pressing.

Numerous other advantages of the invention will become readily apparent from the following detailed description and drawings in which like parts have been designated by the same numeral.

One of the major advantages of the present invention is the provision of a permanent type protection device which fits closely to the trunk of the tree and is not affected by climatic elements and soil conditions while not having to be replaced as the tree trunk grows in diameter.

DESCRIPTION OF THE PREFERRED EMBODIMENTS

Figure 1:
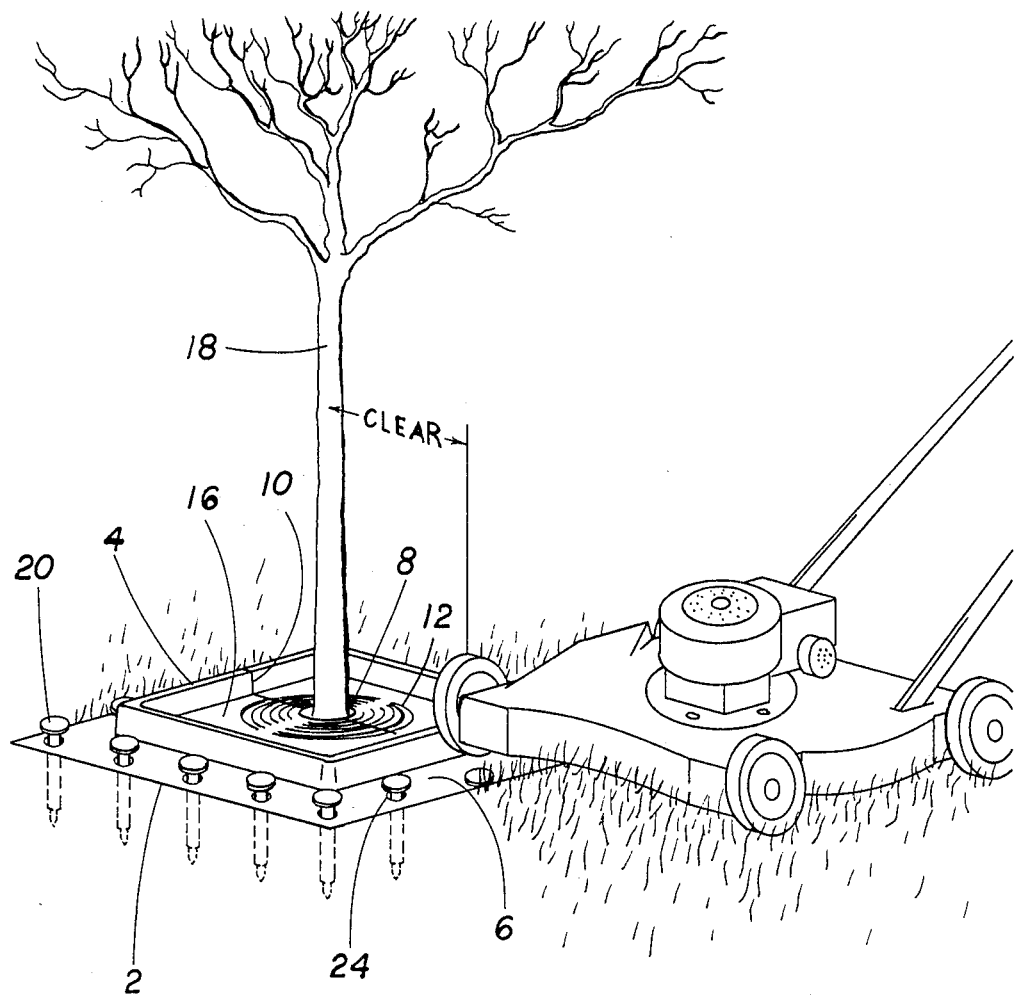
FIG. 1 is a perspective view of the invention installed about a tree showing the protection provided against lawn mower damage to the tree trunk.

Referring to the drawings and particularly FIGS. 1, 2, 3, 4, and 5 there are shown embodiments of the invention having a substantially flat base 2 adapted to closely hug the ground when installed. A barrier wall 4 is intergrally mounted on the base 2 at such a distance from the outer edge of the base that the area of the base between the barrier wall 4 and the edge of the base forms an outwardly extending flange or apron 6. In the preferred embodiment where the device of the invention is molded from a single sheet of material, the barrier wall will, of course, be coextensive with the base. The area of the base enclosed by barrier wall 4 is designated as tray area 16.

The base 2 is provided with a central opening 8 through which the trunk of the tree or plant to be protected projects. A slit 10 is provided in the base 2 which slit extends from the outer edge of the base to opening 8 and continues on the other side of opening 8 for a distance defined by the number of flaps 12 in the base. The tray area 16 of the base comprises a plurality of closely adjacent concentrically arranged semi-circular flaps 12. Each semi-circular flap 12 is attached to the adjacent flap by a hinge means 14. It will be observed from the drawing that the flaps 12 are semi-circular by virtue of the fact that they are cut generally in half by slit 10 forming paris of opposing semi-circular flaps hinged close to their respectively adjacent flap or flaps. It will be readily observable that as a tree trunk enlarges in diameter each pair of opposed flaps may be opened or will automatically open to expand the diameter of the central opening. If desired, the opened flaps may be simply removed by cutting or removing the hinge connecting the opened flap to the next adjacent closed flap.

Figure 2:
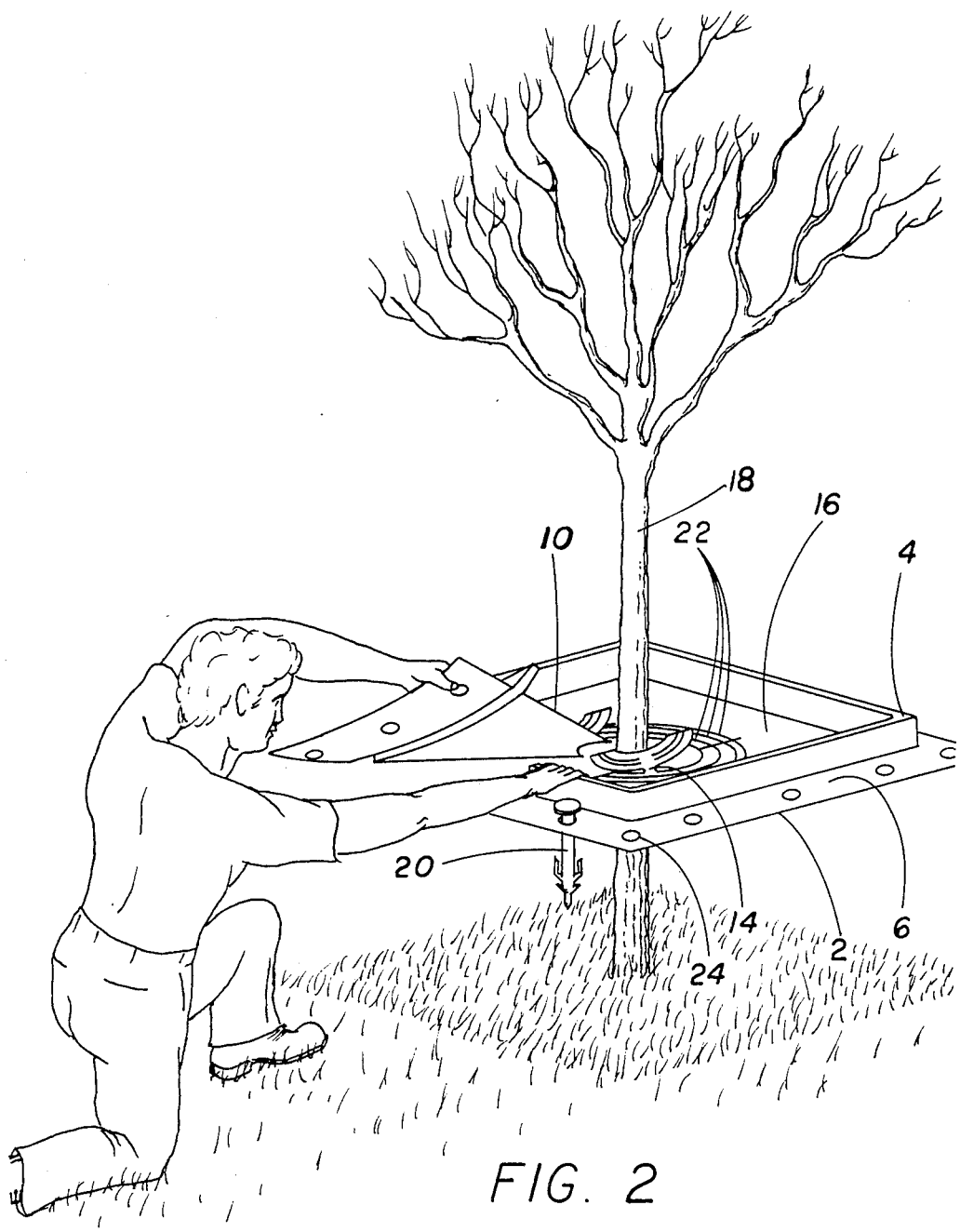
FIG. 2 is a perspective view of the invention being installed about a tree trunk.

Referring particularly to FIG. 2 one can perceive the ease in installing the tree protector of the invention. The slit 10 permits the installer to spread the abutting edges of the slit sufficiently to straddle the trunk 18 of the tree whereby the central opening of the protector may be slipped around the trunk and the protector slipped down to lie flat on the ground gently enclosing the tree at its base. The size of the tree trunk at installation solely determines the number of flaps 12 to be initially opened, if any.

The closed flaps will hug the base of the trunk. As mentioned hereinbefore, the flaps opened to accommodate the tree trunk may be left hinged opened or simply removed by cutting or removing the hinge holding the opened flap. In the preferred embodiments, the slit 10 and the circular slits 22 are as narrow as possible in order that any nutrient material fed to the tree through the protector will slowly pass through the slits.

Figure 6:
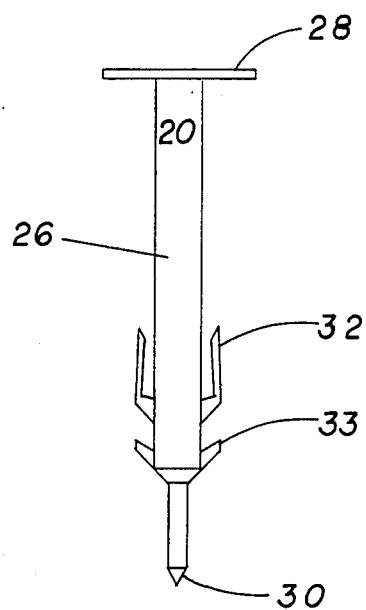
FIG. 6 depicts an anchoring pin.

After the protector flaps have been fitted around the trunk of the tree and the abutting edge of slit 10 realigned, the device will lie substantially flat and hug the ground. The device becomes a permanent fixture when anchor pins 20, are driven through the punch out holes 24 positioned at measured intervals in apron 6. FIG. 6 illustrates an anchoring pin suitable for use in the permanent installation of the device of the invention. The anchoring pin illustrated designated as pin 20 comprises a shank portion 26, a head portion 28, a pointed end 30 and a plurality of hook type members 32 and 33 extending laterally and upwardly from the shank firmly anchoring the base to the ground and preventing removal of the protector after installation.

While the device of the invention may be manufactured by a variety of techniques and from a variety of materials, the simplicity of the devices readily lends itself to assembly line manufacture consisting of vacuum forming followed by clicker die pressing to simply cut and form the slits, flaps, and hinges of the device. For permanent installation, the device should be manufactured using water and not proof, flexible but relatively rigid material, for example, high density polyethylene. In the preferred embodiments an ultra violet inhibitor is incorporated in the material to prevent fading or discolorization during use over a long period of time.

As described hereinbefore, barrier wall 4 serves, not only to prevent damage by a lawn mower or string type cutting devices, but to also contain within the tray area 16 fertilizer, mulch, insecticides or other plant and soil conditioners beneficial to the growth and health of the tree. Any nutrients, fertilizer or the like placed in the tray 16 will slowly filter through slit 10 and circular slits 22 directly feeding the roots of the tree in a highly desired uniform generally circular pattern around the base of the tree.

Figure 3:
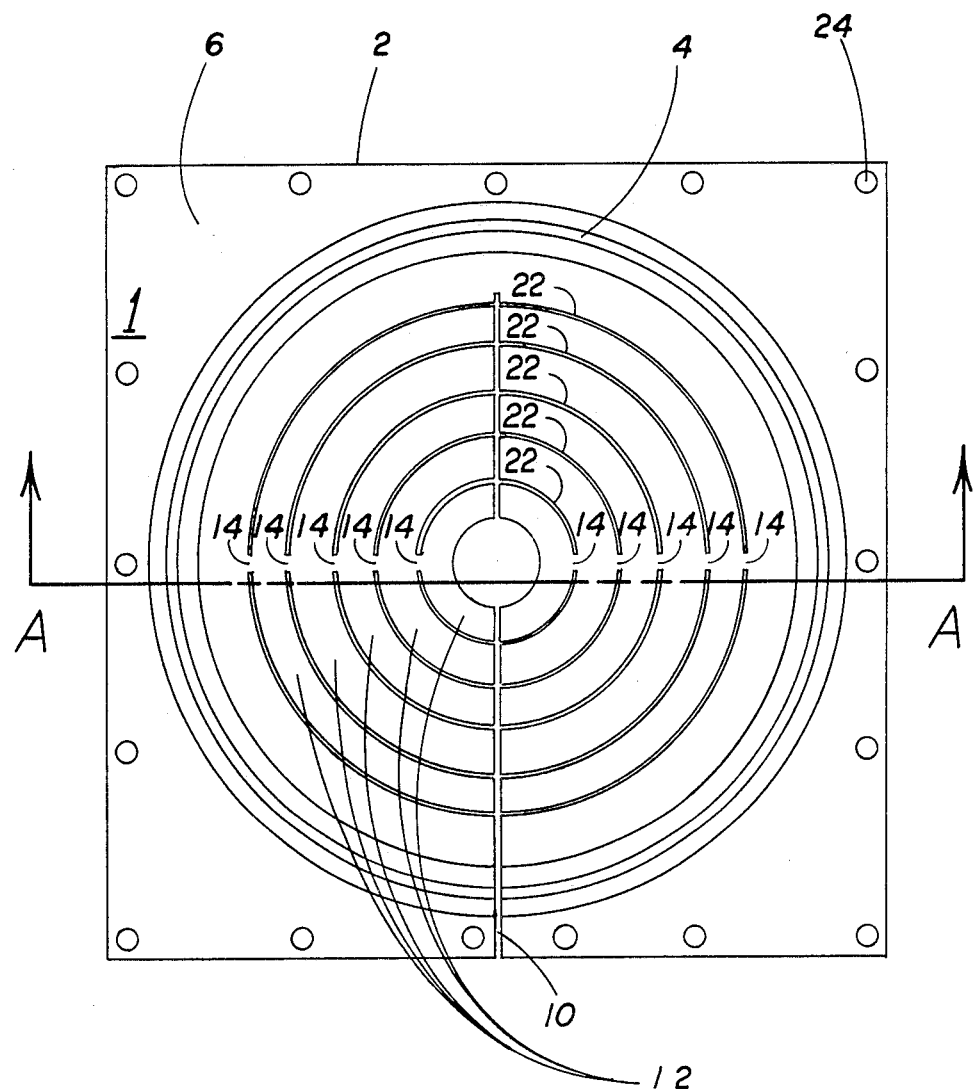
FIG. 3 is a top plan view of the device of the invention.
Figure 4:
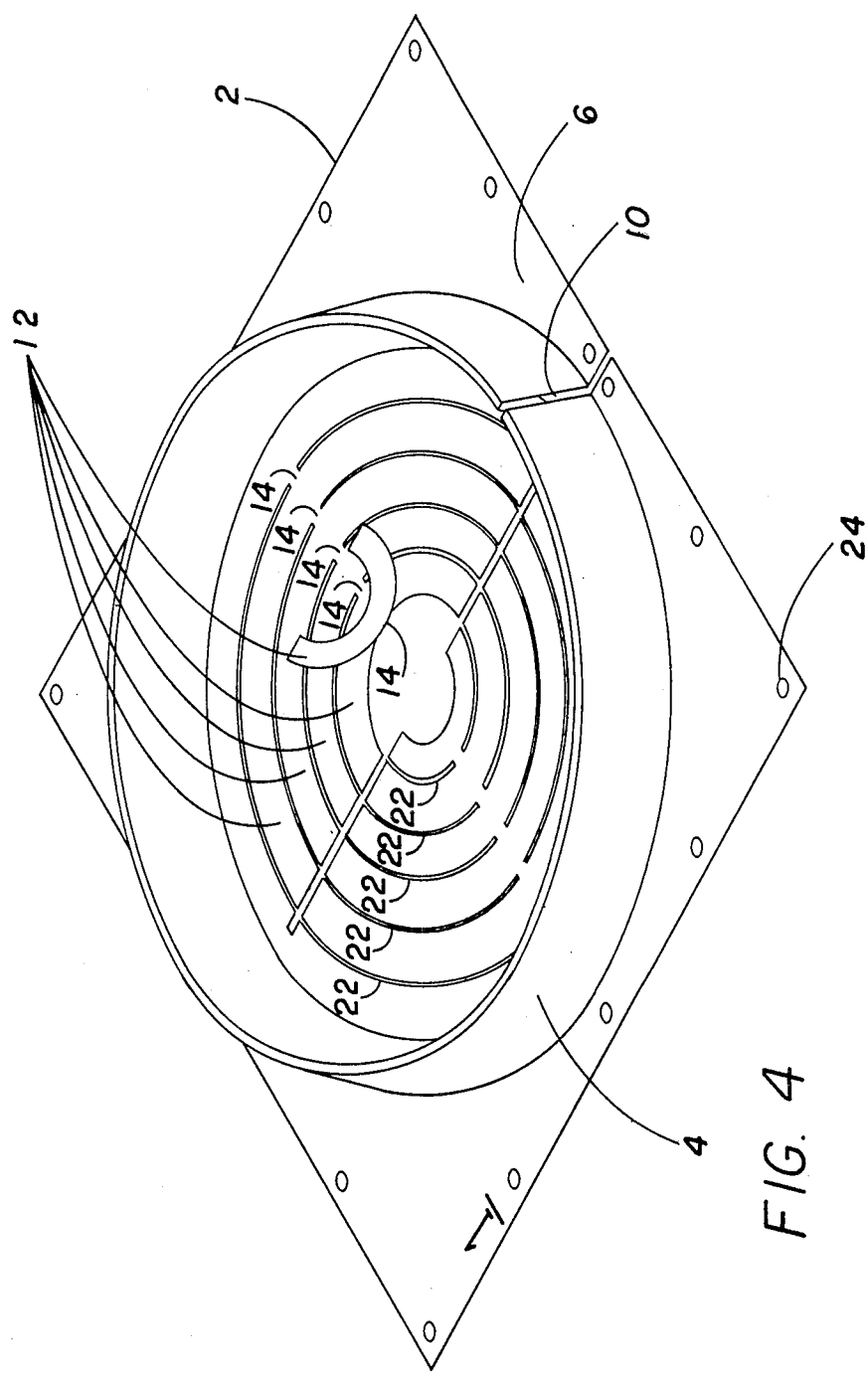
FIG. 4 is a perspective view of the device of the invention illustrating flaps in a raised or open position.
Figure 5:
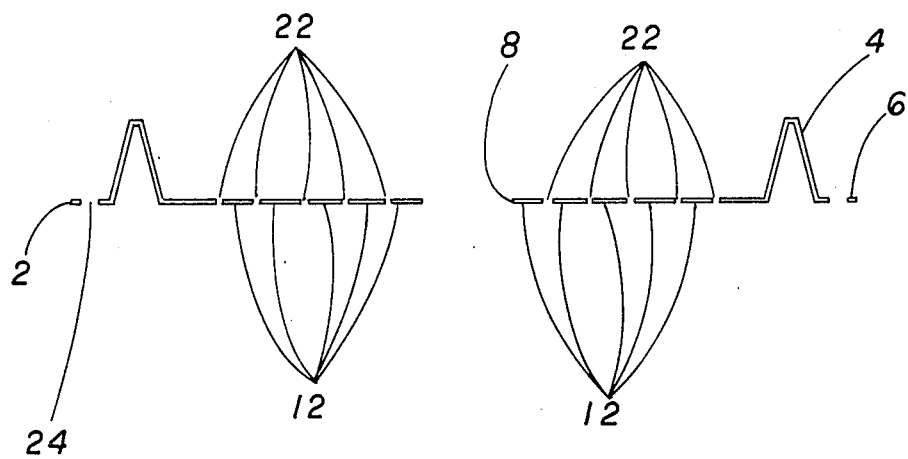
FIG. 5 is a cross sectional view of the protector taken along line A—A of FIG. 3.

The height of barrier 4 wall is a matter of choice so long as it is of sufficient height to prevent any contact with the base of the tree or plant by, for example, lawn mower, string edgers, cutters and the like. The width of flange 6 is also a matter of choice so long as sufficiently wide to allow for anchor pins to be driven therethrough into the ground for stable and permanent installation. In the preferred embodiments thereof, flange 6 is of such width as to prevent grass or weeds growing so close to barrier wall 4 as to hinder mowing around the protector and enable the wheels of a mower or edger to move along the surface of the flange ensuring the cutting of grass or weeds adjacent to the protector as illustrated in FIG. 1. As depicted in the drawing, the barrier wall configuration may be square, rectangular (FIGS. 1 and 2), or circular (FIGS. 3 and 4). It will be appreciated that the barrier wall may take other forms so long as fulfilling the criteria and purpose of construction set out herein.

Although the invention has been described with respect to preferred embodiments, it will be appreciated by those skilled in the art that other modifications and improvements may be made without departing from the spirit and scope of the invention. Accordingly, it is to be understood that the invention is not to be limited by the specific illustrative embodiments, but only by the scope of the appended claims

I claim:

1. A tree or plant protector having a generally flat ground engaging base member, a centrally located opening in said base member, a barrier wall integrally mounted on and perpendicular to the base member and positioned between the outer edge of the base member and the edge of the central opening in the base member, a slit in the protector extending from the outer edge of the base to the central opening and continuing on the other side of the central opening, a plurality of flaps formed in the base member lying within the area formed by the barrier wall and central opening and concentrically arranged with respect to the central opening said slit in the protector base dividing said flaps into pairs of opposing flaps and hinge means connecting each flap to its adjacent flap.

2. The tree protector of claim 1 wherein the area of the base between its peripheral edge and the barrier wall is provided with a plurality of spaced punch out holes through which anchoring means are inserted into the ground to install the tree protector.

3. The protection of claim 1 wherein the hinge means lie in a plane generally at right angles to the slit in the base of the protector.

4. The protector of claim 1 wherein the hinge means comprise a single hinge means connecting a flap to its next adjacent flap.

5. The protector of claim 1 wherein the number of flaps determine the length of the slit in the protector.

* * * * *